(No Model.)

G. E. NEUBERTH.
SURFACE GAGE.

No. 448,863. Patented Mar. 24, 1891.

Witnesses:—
D. H. Haywood
C. Sundgren

Inventor:—
George E. Neuberth
by attorneys
Brown & Seward

UNITED STATES PATENT OFFICE.

GEORGE E. NEUBERTH, OF TORRINGTON, ASSIGNOR OF TWO-THIRDS TO CHARLES H. UPSON AND FRANK G. NEUBERTH, BOTH OF WATERBURY, CONNECTICUT.

SURFACE-GAGE.

SPECIFICATION forming part of Letters Patent No. 448,863, dated March 24, 1891.

Application filed November 12, 1890. Serial No. 371,159. (No model.)

*To all whom it may concern:*

Be it known that I, GEORGE E. NEUBERTH, of Torrington, in the county of Litchfield and State of Connecticut, have invented a new and useful Improvement in a Combined Surface, Scratch, and Depth Gage, of which the following is a specification.

My invention relates to an improvement in a combined surface, scratch, and depth gage in which provision is made for a rapid and exact swinging adjustment of the indicating-bar toward and away from the surface to be leveled, and in which the indicating-bar support may be conveniently clamped in its various adjustments upon the supporting-standard and the bar itself clamped in the desired swinging adjustment.

A practical embodiment of my invention is shown in the accompanying drawings, in which—

Figure 1:
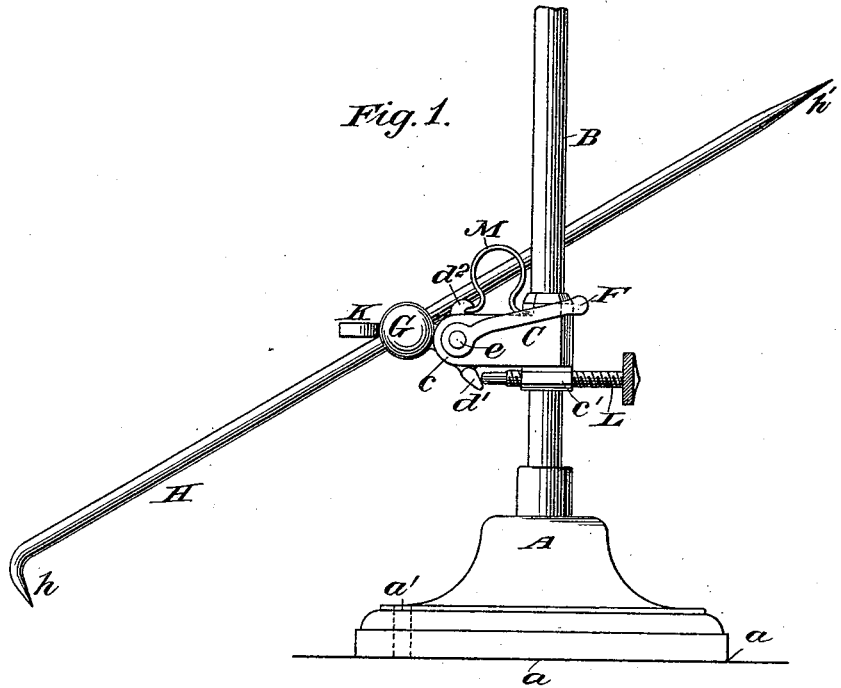
Figure 2:
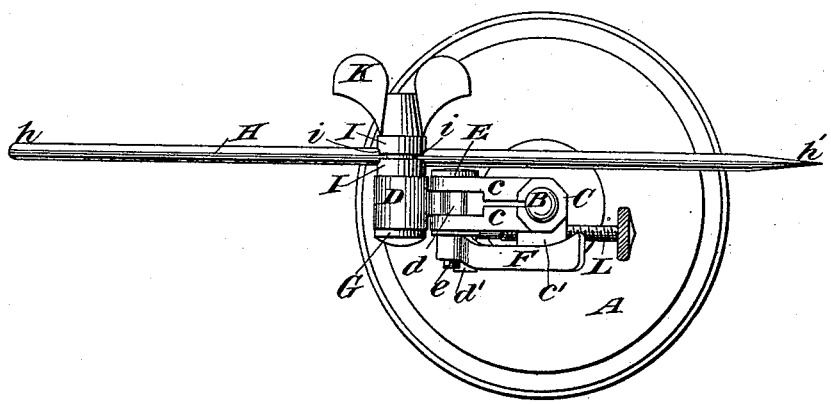

Figure 1 represents the gage in side elevation, and Fig. 2 represents a top plan view.

A represents the base or pedestal, from which a supporting-standard B extends upwardly. The base A is provided with a lower face $a$, intended to be perfectly level, and when placed upon a level surface holds the supporting-standard B, preferably, at right angles to the surface upon which it stands.

An indicator-bar support consists of a pair of spring-jaws $c$, projecting laterally from a sleeve or socket portion C, the latter being fitted as perfectly as may be to the supporting-standard B. The jaws $c$ have their adjacent faces slightly separated, so that pressure upon their outer ends tending to force the jaws toward one another will tend to compress the sleeve or socket portion C tightly about the supporting-standard B, and will thereby hold it in any desired position upon the standard B.

Between the outer ends of the jaws $c$ a socket-piece D is pivotally secured, preferably by means of a pivotal bolt E, which extends laterally through suitable perforations in the ends of the jaws $c$ and through an opening in the branch $d$ of the socket-piece. The bolt E is provided with a screw-thread on its projecting end $e$, and a tail-nut F is fitted to screw on the end $e$ and bear against the outer side of one of the jaws, and, together with the head of the bolt upon the outer face of the opposite jaw, serves, when screwed on, to draw the jaws toward one another and simultaneously clamp the jaws to the supporting-standard B, and also the socket-piece between them. The fit, however, is such that the compression of the free ends of the jaws $c$ will clamp the jaws to the supporting-standard slightly in advance of clamping the socket-piece between their ends, so that the socket-piece may be allowed to swing in a vertical plane between the jaws after the jaws have been compressed sufficiently to secure them in vertical adjustment upon the supporting-standard.

Transversely through the outer end of the socket-piece D a pivotal bolt G, extends, and transversely through the said bolt, at a point in its projection beyond the socket-piece D, there is a perforation in which the indicator-bar H is seated. The indicator-bar H is here shown as a smooth round rod provided at one end with a sharpened point $h$, turned at right angles to the body of the bar, and at the opposite end is sharpened into a point $h'$, extending in the direction of the body of the bar. The body of the bar has a free sliding movement through the transverse perforation in the pivotal bolt and is clamped in the desired adjustment to the socket-piece D by means of a pair of cheeks I, which loosely fit the pivotal bolt in proximity to the position of the indicator-bar and are provided with recesses $i$ upon the opposite sides of their adjacent faces, in which a portion of the body of the bar is received when the cheeks are pressed toward each other. A thumb-nut K, which screws onto the threaded end of the pivotal bolt G, serves to force the cheeks toward each other and toward the end of the socket-piece, so that when the said nut is turned on tightly the indicator-bar H will be tightly clamped against longitudinal displacement within its seat and at the same time will be locked to the socket-piece against swinging adjustment relative thereto.

The socket-piece D is provided with a depending lug or arm $d'$, formed integral with or fixed thereto, against which the end of an adjusting-screw L bears for the purpose of rocking the socket-piece upon its pivotal connection with the jaws c to adjust the free end of the indicator-bar up and down. The adjusting-screw L is seated in a threaded socket c' in the depending portion of the sleeve or socket-piece C. Because of the short distance between the pivotal connection of the socket-piece and the point where the adjusting-screw engages the lug d' and the long distance between said pivotal point and the end of the indicator-bar a slight advance or backward movement of the adjusting-screw will serve to elevate or depress the end of the indicator-bar a considerable distance. For example, in a tool of the size and proportion of that indicated in the accompanying drawings, suppose the adjusting-screw L to have about twenty-four threads to the inch. A single turn of the screw would lift or lower the end of the bar one-half inch or more.

To hold the bearing d' at all times in contact with the adjusting-screw L and to return it promptly to such position from any temporary adjustment of the bar to level a surface higher than the one first operated upon, I provide a spring M, one end of which is engaged with the sleeve or socket portion C and the other in a notch or seat in the face of an upwardly-projecting lug $d^2$, formed integral with or fixed to the socket-piece D. The tension of the spring M serves at all times to press against the lug $d^2$ to throw the socket-piece over in a direction to lower the end of the indicator-bar, and any raising of the bar by the swinging of the socket-piece D is accomplished against the tension of said spring.

In operation, the pedestal A having been placed upon a level surface and the indicator-bar H having been adjusted so that its point h will sweep over the surface to be leveled, the said bar is clamped to the socket-piece D by turning the nut K. The point h of the indicator-bar may then be brought into close proximity to the surface to be leveled by turning the adjusting-screw L, and thereby swinging the socket-piece D. If, in connection with the adjustment referred to, it be desired to level another surface in proximity to that just operated upon, but in a higher plane, the adjusting-screw L may be left in its position, and by taking hold of the indicator-bar it, together with the socket-piece H, may be swung upon the pivotal bolt E upwardly to bring the point h of the indicator-bar into close proximity to the higher surface to be leveled, and in such position it may be temporarily locked by a partial turn of the tail-nut F. When the upper surface has been leveled, the indicator-bar may be returned to its position to again test the lower surface by simply releasing to a slight extent the tail-nut F. In all adjustments the supporting and clamping jaws c, with their sleeve portion C, may be secured to the supporting-standard B in the desired vertical adjustment by turning the tail-nut F sufficient to close them about the standard and at the same time leave the socket-piece D free to rock.

By arranging the indicator-bar with its point h' in contact with an uprising surface and fixing it in the desired position the tool may be employed as a scratch by moving it bodily along with said point in contact with the surface. By swinging the indicator-bar around into vertical position and passing its lower end down through an opening a' in the base A the end of said bar may be employed to indicate depth or to operate upon a surface below the base.

What I claim is—

1. In a gage, the combination, with a suitable base and standard, of a vertically-movable support engaged with the standard, a swinging piece carried by the vertically-movable support, an indicator-bar carried by the swinging piece, a clamping device for securing the support to the standard and the swinging piece to the support, a clamping device for locking the indicator-bar to the swinging piece, and an adjusting device seated in the support and engaged with the swinging piece, substantially as set forth.

2. In a gage, the combination, with a suitable base and standard, of a vertically-adjustable support engaged with the standard, the said support comprising a pair of springing jaws terminating in a sleeve fitted to the standard, a bolt and nut for closing the jaws, a rocking piece pivoted on said bolt, and an indicator-bar carried by said rocking piece, the engagements of the jaws and sleeve with the rocking piece and standard being so timed that the sleeve will be forced into contact with the standard in advance of the clamping of the pivotal piece between the jaws, substantially as set forth.

GEORGE E. NEUBERTH.

Witnesses:
CHAS. L. MCNEIL,
ALBERT SPERRY.